Nov. 17, 1959   A. COYNE ET AL   2,912,861
METHOD OF AND APPARATUS FOR THE MEASUREMENT AND THE
CONTROL OF THE DIFFERENCE BETWEEN
TWO PHYSICAL QUANTITIES
Filed Nov. 1, 1955
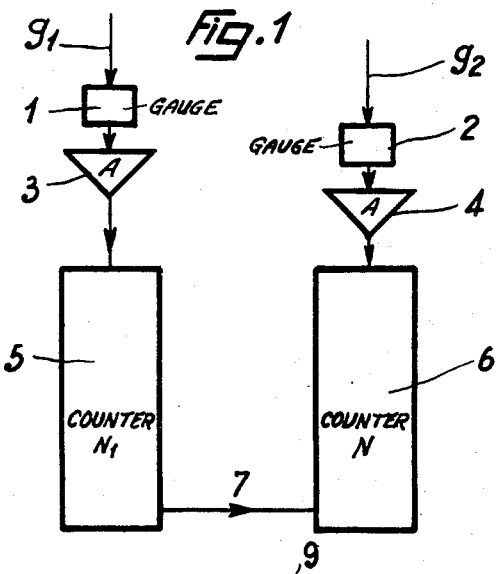
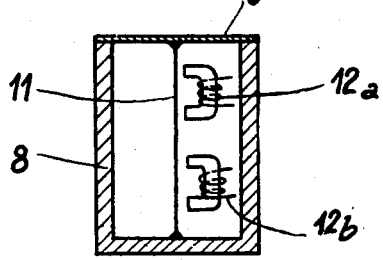
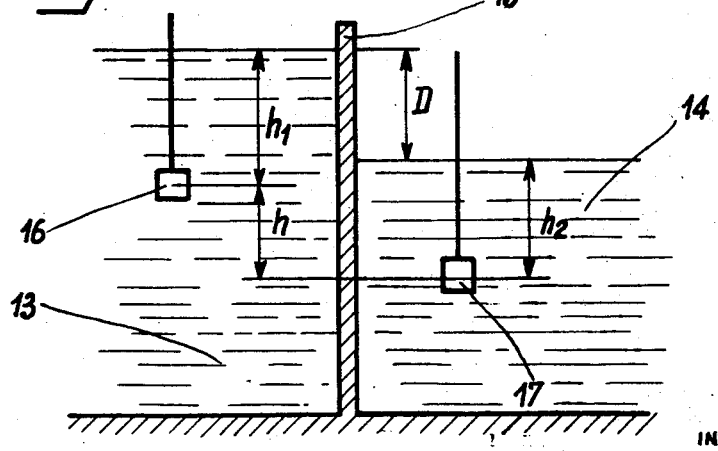
INVENTORS
ANDRE COYNE
JEAN BELLIER
By Watson, Cole, Grindle & Watson
ATTORNEYS United States Patent Office 2,912,861
Patented Nov. 17, 1959

2,912,861

METHOD OF AND APPARATUS FOR THE MEASUREMENT AND THE CONTROL OF THE DIFFERENCE BETWEEN TWO PHYSICAL QUANTITIES

André Coyne and Jean Bellier, Paris, France

Application November 1, 1955, Serial No. 544,246

Claims priority, application France April 27, 1955

3 Claims. (Cl. 73—301)

Measuring devices are already known which are able to convert a physical quantity into a frequency of oscillation or of vibration. With apparatus of this kind, a measurement can be made by counting, for example by means of an electronic counter, the number of oscillations or vibrations which are produced during a predetermined time. A corresponding curve or table will then enable the value of the quantity to be measured to be deduced.

It happens however that in some cases the absolute value of a quantity of this kind is not important, but what is required to be known with precision is its value compared with, or its difference with respect to a second quantity of the same nature. This second quantity may have a fixed value but in most cases, the two quantities are liable to vary either independently or correlatively; they may, for example, be subject to accidental variations which cause them to vary by the same amount.

Attempts have been made to accomplish such measurements by using differential measuring apparatus, that is to say a device which is sensitive only to the difference of the quantities to be measured.

Such a solution is only applicable in the case of two quantities. In particular, it is not possible, without a degree of complexity which is practically prohibitive, to use this method for the differential measurement of a number of quantities with respect to a single quantity used as a basis of reference. Furthermore, measuring devices which convert a measured quantity into frequency are not in general adapted for detecting the differential action of two quantities.

The main object of the present invention is to compare the value of any two physical quantities which may be subject to equal and casual variations, by means of two measuring devices which are similar but have different settings, one of the devices being subjected to the first quantity to be used as a reference, and the other to the second quantity of which it is desired to measure the difference with respect to the first quantity, the said devices being arranged to convert each of the said quantities into a frequency of vibration in accordance with the same law of conversion.

In the accompanying drawings:

Fig. 1 is a synoptic diagram of a measuring system in accordance with the invention, comprising two measuring devices, each of which supplies a variable frequency.

Fig. 2 shows a cross-section of a pressure-gauge of the vibrating-cord type.

Fig. 3 shows the application of these gauges in an arrangement in accordance with the invention for the measurement of the difference in levels of two reservoirs in the open air, the reservoirs being filled with the same liquid and communicating with each other through a porous wall.

Let $g_1$ be the value of the reference quantity; the second quantity $g_2$ is by hypothesis equal to $g_1+D$, where D is the difference which is to be measured. The first device to which the quantity $g_1$ is applied, supplies a frequency of vibration which can be written in the form $n_1 = K_1 f(a+g_1)$, in which $a$ represents the initial conditions of setting expressed in units of the said quantity, and $K_1$ is a constant coefficient of proportionality. Now, the second device is similar to the first, that is to say its frequency of vibration is expressed by the same law with a coefficient of proportionality $K_2$; its vibration frequency may thus be expressed as:

$$n_2 = K_2 f(b+g_1+D)$$

in which $b$ represents the initial conditions of setting of this second device expressed in units of the said quantity.

Let $N_1$ be a predetermined number of vibrations of the first apparatus; the time required for the completion of this number of vibrations is $$t = \frac{N_1}{n_1}$$

The number N of vibrations of the second device during the time $t$ will thus be:

$$N = n_2 \times \frac{N_1}{n_1}$$

or $$N = \frac{K_2}{K_1} \times \frac{f(b+g_1+D)}{f(a+g_1)} \cdot N_1$$

the number N thus depends on the two variables D and $g_1$, i.e. of the reference quantity and of the difference to be measured. However, if it is proposed only to carry out the measurement in the vicinity of a certain value $D_0$ corresponding to the normal difference between the two quantities, the number N will be practically independent of $g_1$ and will depend only from $\Delta D = D - D_0$ if $f(b+g_1+D_0) = f(a+g_1)$, that is to say if, whatever the function $f$ may be, $b+D_0 = a$. In other words, the difference between the initial settings of the two devices, expressed in units of the quantity to be measured, corresponds to the arbitrary chosen difference between the two quantities in the vicinity of which it is desired to carry out the measurement. It will be noted that the casual variations which may simultaneously affect the two quantities at the same time and in the same sense, do not affect this result.

The measuring device 1 to which is applied the reference quantity $g_1$, is designed for converting it into vibrations of a corresponding frequency; this device is coupled to a chain of electronic counters 5 through an amplifier 3. The quantity $g_2$ of which it is desired to know the difference with respect to $g_1$, is applied to a measuring device 2 which similarly converts it into a second frequency of vibrations, transmitted to an electronic counter 6 through an amplifier 4. The chains of counters 5 and 6 are interconnected through a line shown diagrammatically at 7 which enables the counter 6 to be stopped when the counter 5 has effectively counted a predetermined number of vibrations supplied by the device 1.

The devices 1 and 2 may conveniently be conventional acoustic manometers of metrology devices of the vibrating cord type, and more particularly pressure gauges, for the the measurement of the difference between two liquid levels. Such a device is described in Patent No. 2,604,787. It will suffice to say that, as shown in Fig. 2, it comprises a fluid-tight and rigid casing 8, closed by an elastic wall 9 to which is applied the pressure to be measured. The tension of the vibrating cord 11 mounted inside the said gauge, will thus vary in accordance with the pressure applied to the wall 9. This cord is set in vibration by an electromagnet 12a and its vibrations are received by a second electro-magnet 12b which acts as a microphone. In order to maintain the vibration of the cord 11, a fraction of the current induced in the electro-magnet 12b is fed after amplification, to the electro-magnet 12a.

Fig. 3 shows two reservoirs 13 and 14 separated by a porous vertical partition 15. These two reservoirs are filled with the same liquid, for example water; the reservoir 13 supplies the reservoir 14 through the porous wall 15 which, in normal working, that is to say when it is not clogged by impurities which reduce its filtration power, provides a difference $D_0$ between the levels of the reference reservoir 13 and the reservoir 14. In practice, the difference D slightly diverges from $D_0$, and the problem is to detect this difference. The two reservoirs are both subject to atmospheric pressure. Into the first reservoir is immersed a pressure gauge 16, at a depth $h_1$, and into the second reservoir, a pressure gauge 17 is immersed at a depth $h_2$. The difference in heads of the two gauges is $h$, such that $h_2 = h_1 + h - D$.

The gauges 16 and 17 are connected to chains of counters such as 5 and 6 shown in Fig. 1, the first chain being arranged to stop the second chain when it reaches a predetermined number $N_1$ of vibrations. In this case, the function $f$ is parabolic. The first gauge provides, as is well known, a frequency of vibrations:

$$n_1 = K_1 \sqrt{a - h_1}$$

and the frequency of vibration of the second gauge will be:

$$n_2 = K_2 \sqrt{b - h_2}$$

and this latter equation may be written:

$$n_2 = K_2 \sqrt{b - h_1 - h + D}$$

The number N of vibrations counted by the second device is thus:

$$N = \frac{K_2}{K_1} \frac{\sqrt{b - h_1 - h + D}}{\sqrt{a - h_1}} N_1$$

The number N thus depends on the parameters $a$, $b$, $h$, and on the variables $h_1$ and D. Since it is proposed to control the value of the difference D around the value $D_0$, it is possible as previously indicated to make the number N independent of the variations of $h_1$ by making $(b - h_1 - h + D_0)$ equal to $(a - h_1)$. The relation is thus written $D_0 = a - b + h$. As in the previous case, $a$ and $b$ are parameters which correspond to the respective presetting of the devices, that is to say the parameters which cause the difference in the fundamental sounds emitted by the vibrating cords when the gauges are working under the same conditions, for example in free air, that is to say subjected only to the pressure of the atmosphere.

The vertical distance $h$ between the two gauges represents a head of water and thus a pressure which can also be compared to a difference of initial settings of the two gauges. In fact, in immersing a gauge, the pressure which is applied to it is changed; this change physically affects the variable $h_1$ and, in consequence, it may be replaced mathematically by an equal variation of opposite sign applied to the term $a$ of the initial setting. In consequence, it will be seen that it is possible to satisfy the desired condition of dependence either by effecting in the first place the appropriate initial settings of the gauges, or, especially if the initial settings themselves are not perfect, by adjusting the respective depths $h_1$ and $h_2$ of the two gauges one with respect to the other. There can be stated:

$$z = b - h_1 - h + D_0 = a - h_1$$

and $\Delta D = D - D_0$. When the appropriate setting has been made, the following relation is obtained:

$$N = \frac{K_2}{K_1} \sqrt{\frac{z + \Delta D}{z}} \cdot N_1$$

that is to say:

$$N = K \sqrt{1 + \frac{\Delta D}{z}} \quad (1)$$

in which $$K = \frac{K_2}{K_1} \cdot N_1$$

K can be considered as a coefficient of sensitivity. The error due to the variation of $h_1$ becomes smaller as $$\frac{\Delta D}{z}$$

becomes smaller, that is to say as $z$ becomes greater. Physically, the error in the variation of D becomes smaller as $h_1$ becomes farther removed from $a$, or in other words, as the initial frequency of the gauges becomes greater.

In this particular case, the value $\Delta D$ may be deduced from the Equation 1 and can be written:

$$\Delta D = z \left( \frac{N_2}{K_2} - 1 \right)$$

The variations of D, which is the quantity to be measured, are thus related to the number N which is counted by a parabolic law.

When $\Delta D = 0$, the particular value $N_0$ of N is equal to K, that is to say:

$$N_0 = K = \frac{K_2}{K_1} \cdot N_1$$

The values of $K_2$, $K_1$ and $N_1$ may be chosen in such a way that $N_0$, that is to say K, is a round number. $z$ and K can also be chosen sufficiently large for the curve which represents $\Delta D$ to be merged with its tangent, and in addition, to choose on the parabola which represents this law, the point of operation of the arrangement so that it corresponds to a slope, that is to say to a certain fixed scale. In this way, there can be obtained in the vicinity of the desired difference, a scale of this difference, which is practically linear as a function of the vibrations counted and, in addition, to cause the round numbers of N counted to correspond to round numbers counted of the difference to be measured or to be controlled.

The method and the arrangement in accordance with the invention enable the simple comparison to be made of the levels of a number of reservoirs such as 14 with respect to a given reservoir 13. The gauge 16 will serve as the reference gauge, the other gauges, one per reservoir, being adjusted with reference to this reference gauge. It is also possible to use a same counter successively for the control of the various differences in levels, and even to use the same scale of graduation.

What we claim is:

1. The combination, with at least two apparatuses designed for converting the magnitude of a physical factor applied thereto into electrical oscillations whose frequency varies accordingly to said magnitude, said apparatuses being identical but differently pre-set whereby the frequencies produced thereby are equal upon application thereto of magnitudes having a predetermined difference, of electronic counting means connected with one of said apparatuses for generating a signal after collecting a predetermined number of cycles of the electrical oscillations produced by said apparatus, and further electronic counting means connected with the other apparatus and with the former counting means for measuring the number of cycles of the electrical oscillations produced by said other apparatus until said signal is generated.

2. The combination of claim 1 wherein each apparatus comprises a ferro-magnetic vibrating cord, electromagnetic means for setting said cord in vibration, electromagnetic means for generating a current having a frequency equal to the vibration frequency of said cord, and means for varying the tension of said cord in accordance with the magnitude of the physical factor to be measured.

3. The combination of claim 2 wherein the cords of the apparatuses are given a different initial tension such that they vibrate at the same frequency when subjected to forces having a predetermined difference.

References Cited in the file of this patent

UNITED STATES PATENTS

| | | |
|---|---|---|
| 711,521 | Parmelee | Oct. 21, 1902 |
| 2,050,674 | Stover | Aug. 11, 1936 |
| 2,306,137 | Pabst et al. | Dec. 22, 1942 |
| 2,406,221 | Hornfeck | Aug. 20, 1946 |
| 2,448,298 | Fligue | Aug. 31, 1948 |
| 2,576,900 | Brockman | Nov. 27, 1951 |
| 2,604,787 | Coyne | July 29, 1952 |

FOREIGN PATENTS

| | | |
|---|---|---|
| 472,023 | Germany | Dec. 25, 1923 |